US012773618B2

(12) United States Patent
Li

(10) Patent No.: US 12,773,618 B2
(45) Date of Patent: Oct. 27, 2026

(54) RACING SIMULATION DEVICE AND ALGORITHM BASED ON HIGH PRECISION AND HIGH RESPONSE TORQUE CLOSED LOOP

(71) Applicant: SHENZHEN SOMO TECHNOLOGY CO., LTD., Shenzhen (CN)

(72) Inventor: Jinquan Li, Shenzhen (CN)

(73) Assignee: SHENZHEN SOMO TECHNOLOGY CO., LTD., Shenzhen (CN)

(*) Notice: Subject to any disclaimer, the term of this patent is extended or adjusted under 35 U.S.C. 154(b) by 232 days.

(21) Appl. No.: 18/598,126

(22) Filed: Mar. 7, 2024

(65) Prior Publication Data

US 2025/0083035 A1 Mar. 13, 2025

(30) Foreign Application Priority Data

Sep. 13, 2023 (CN) ......................... 202311180566.2

(51) Int. Cl.
*G09B 9/042* (2006.01)
*A63F 13/245* (2014.01)
*G09B 9/02* (2006.01)
*G09B 9/04* (2006.01)

(52) U.S. Cl.
CPC ............ *A63F 13/245* (2014.09); *G09B 9/042* (2013.01); *G09B 9/02* (2013.01); *G09B 9/04* (2013.01)

(58) Field of Classification Search
CPC .. A63F 13/245; A63F 2300/8017; G09B 9/04
See application file for complete search history.

(56) References Cited

U.S. PATENT DOCUMENTS 4,660,671 A * 4/1987 Behr .................... B62D 5/0463 180/404

FOREIGN PATENT DOCUMENTS

CN 212785052 U * 4/1987 ............... H02K 7/14
CN 217511147 U * 9/2022 ........... A63F 13/245

OTHER PUBLICATIONS

Conrad (Year: 2021).*
Xu (Year: 2023).*

* cited by examiner

*Primary Examiner* — Robert J Utama
(74) *Attorney, Agent, or Firm* — Tutunjian & Bitetto, P.C.

(57) ABSTRACT

Disclosed are a racing simulation device and algorithm based on a high precision and high response torque closed loop. The racing simulation device includes a quick release module, a motor module, a sensing module and a sleeve. One end of the motor module is connected to the sensing module; a connecting seat is disposed at one end of the sleeve, one end of the connecting seat is connected to the sleeve, and the other end of the connecting seat is disposed inside the quick release module; one end of the quick release module is connected to a steering wheel; the torque closed loop adopts incremental PI adjustment output, which is accumulated with torque feedforward to output a given current, and current amplitude is limited, so an entire torque is closed to form a double-closed-loop form in combination with a current closed loop, and torque precision control is further improved.

4 Claims, 5 Drawing Sheets

RACING SIMULATION DEVICE AND ALGORITHM BASED ON HIGH PRECISION AND HIGH RESPONSE TORQUE CLOSED LOOP

TECHNICAL FIELD

The present disclosure relates to the technical field of racing simulation, and more particularly, to a racing simulation device and algorithm based on a high precision and high response torque closed loop.

BACKGROUND

Globally, the number of racing simulation systems is increasing exponentially, with an annual growth rate of around 30% in the past three years. By 2022, it was estimated that 500,000 simulated racing wheelbases and other peripheral supporting products had been sold. In the future, there will be more and more players, and the competition between foreign and Chinese native racing simulation suppliers will become increasingly fierce, with huge growth potential.

Simulated racing wheelbases generally have the problems of inaccurate torque and poor dynamic response due to torque open loops. While such problems are the key technology for the simulated racing wheelbases. Many companies also need to urgently solve these problems, and the market demand is enormous.

To achieve a torque closed loop, a traditional torsion sensor applied to a robot is a dynamic torsion sensor that measures torsion as a motor rotates, but cannot accurately measure the force exerted externally. The present disclosure designs a static torsion sensor, which can accurately sense the force feedback of a steering wheel with an accuracy of 0.1%.

The torque closed loop has a force feedback unit that can sense the force output of the steering wheel, thus belonging to closed loop control. It is often used in mechanical arm glass edging and other occasions where a force needs to be precisely controlled. Moreover, due to the limitations of simulated racing wheelbases, great challenges have been posed to the corresponding structures, hardware, and algorithms.

SUMMARY

The purpose of the present disclosure is to propose a racing simulation device and algorithm based on a high precision and high response torque closed loop so as to overcome the shortcomings in the prior art.

In order to achieve the above objective, the present disclosure adopts the following technical solution.

The present disclosure provides a racing simulation device and algorithm based on a high precision and high response torque closed loop. The racing simulation device includes a quick release module, a motor module, a sensing module and a sleeve; one end of the motor module is connected to the sensing module, and the sensing module is disposed inside the sleeve; a connecting seat is disposed at one end of the sleeve, one end of the connecting seat is connected to the sleeve, and the other end of the connecting seat is disposed inside the quick release module; and one end of the quick release module is connected to a steering wheel.

Preferably, the quick release module includes a fixed seat, an outer cover and a quick release control panel; one end of the fixed seat is connected to the steering wheel, and one end of the connecting seat is disposed inside the fixed seat; the outer cover is disposed on the fixed seat in a sleeving manner, and the quick release control panel is disposed inside the fixed seat; and the steering wheel is internally provided with a steering wheel control panel, and the quick release control panel is electrically connected to the steering wheel control panel.

Preferably, the motor module includes a motor body, and two ends of the motor body are respectively provided with a front cover and a rear cover; the motor body is internally provided with a motor shaft; and one end of the motor shaft passes through the motor body, is disposed inside the sleeve, and is connected to the sensing module.

Preferably, the sensing module includes a torsion sensor, an expansion sleeve and an adapter sleeve; the expansion sleeve is disposed on the motor shaft in a sleeving manner, and the adapter sleeve is disposed on the expansion sleeve in a sleeving manner; and the torsion sensor is disposed on the adapter sleeve in a sleeving manner, and is connected to the adapter sleeve and the sleeve, respectively.

Preferably, the sensing module further includes a signal amplifier, and the signal amplifier is disposed at one side of the torsion sensor; and one end of the signal amplifier is connected to the torsion sensor, and the other end of the signal amplifier is connected to the quick release control panel.

Preferably, a slip ring is further provided on one side of the motor body, and the slip ring is connected to the motor body; the slip ring includes a stator and a rotor, and the stator is disposed on the rotor in a sleeving manner; the stator is connected to the motor body, and the rotor is connected to the motor shaft; and the rotor is provided with a slip ring signal line, and the slip ring signal line passes through the motor shaft and the connecting seat and is connected to the quick release control panel.

Preferably, the slip ring further includes a slip ring head, and one end of the slip ring head is connected to the rotor; a motor control panel located inside the rear cover is disposed at one side of the motor body; and an encoder is disposed on the motor control panel, and the slip ring head is positioned corresponding to the encoder.

An algorithm based on a high precision and high response torque closed loop includes a static torsion sensor, which detects the torsion on a steering wheel; a quick release control panel, which performs signal amplification and data conversion; a slip ring and a slip ring signal line, through which data transmission is performed; and a motor control panel, which receives torsion data for implementation of a torque closed loop algorithm.

Compared with the prior art, the present disclosure has the following beneficial effects.

According to the present disclosure, a racing simulation device and algorithm based on a high precision and high response torque closed loop are designed. The torsion sensor is mounted on the motor shaft between the steering wheel and the motor, which is close to the steering wheel, and thus can accurately sense the force of the steering wheel for control. The static torsion sensor detects the torsion on the steering wheel, the quick release control panel performs signal amplification and data conversion, data transmission is performed through the slip ring and the slip ring signal line, and the motor control panel receives torsion data for implementation of a torque closed loop algorithm. The torque closed loop adopts incremental PI adjustment output, which is accumulated with torque feedforward to output a given current, and current amplitude is limited, so that an entire torque is closed to form a double-closed-loop form in combination with a current closed loop, and torque precision control is further improved. Therefore, during racing simulation, the situations of a racing car crossing a road shoulder, a grassland and a sand land, being loaded, and the like can be truly simulated, which gives people a real feeling, improving the user experience, and bringing ultimate experience especially for a racing driver. Through the algorithm, both the torque closed loop and the current closed loop are implemented for precise force control.

BRIEF DESCRIPTION OF FIGURES

The above and/or additional aspects and advantages of the present disclosure will become apparent and easy to understand from the description of the embodiments in conjunction with the following drawings, where.

REFERENCE NUMERALS

Figure 1:
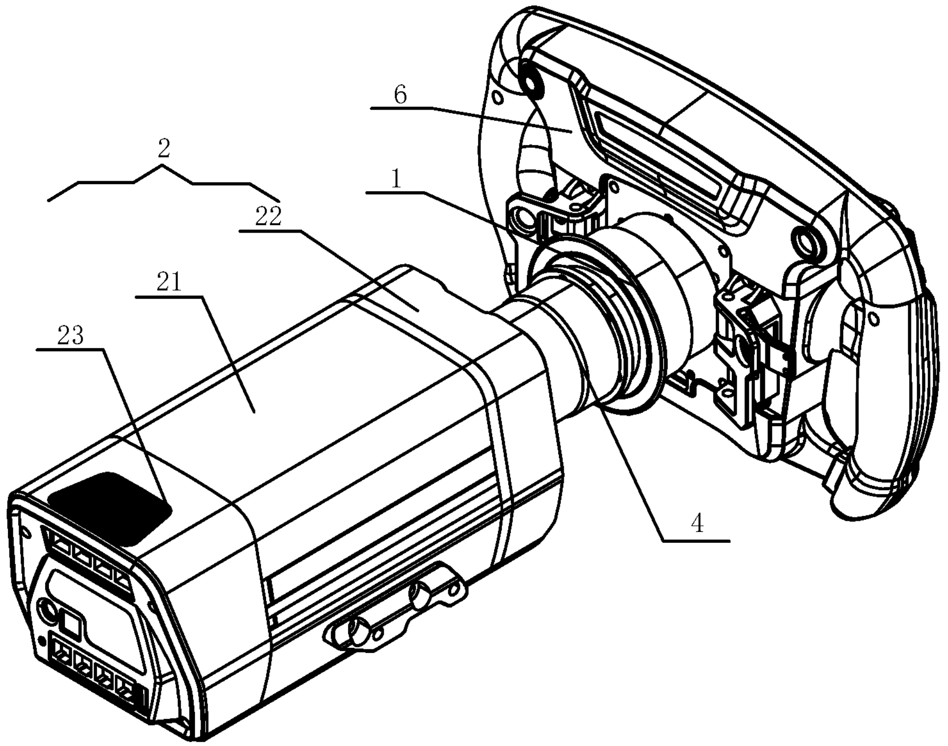
FIG. 1 is a schematic diagram of a structure according to the present disclosure.
Figure 2:
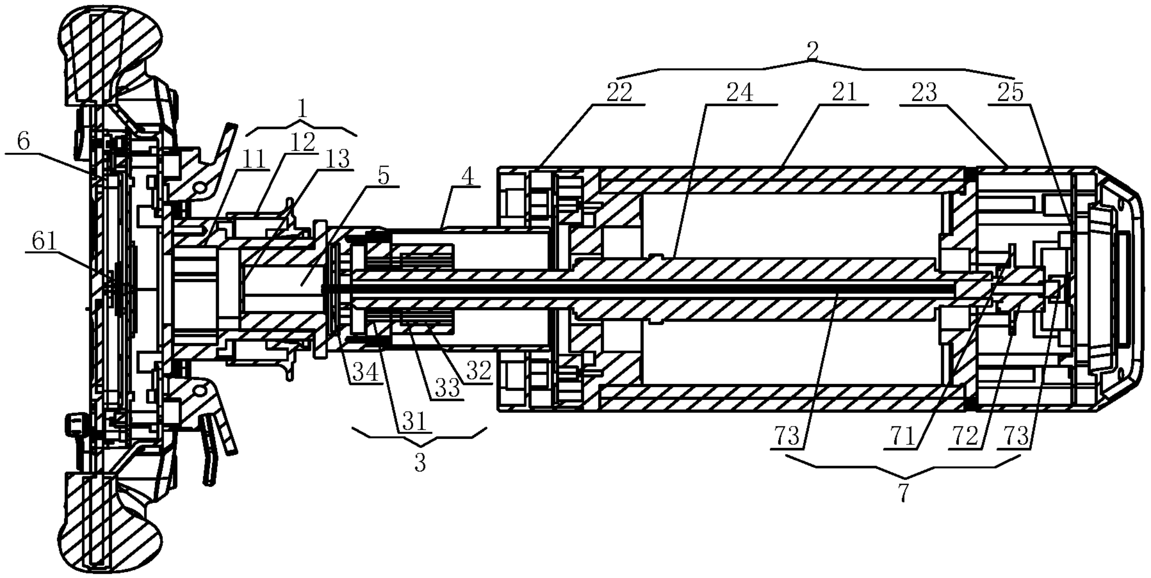
FIG. 2 is a cross-sectional view according to the present disclosure.

1 denotes a quick release module, 2 denotes a motor module,
3 denotes a sensing module, 4 denotes a sleeve,
5 denotes a connecting seat, 6 denotes a steering wheel,
7 denotes a slip ring, 11 denotes a fixed seat,
12 denotes an outer cover, 13 denotes a quick release control panel,
21 denotes a motor body, 22 denotes a front cover,
23 denotes a rear cover, 24 denotes a motor shaft,
25 denotes a motor control panel, 31 denotes torsion sensor,
32 denotes an expansion sleeve, 33 denotes an adapter sleeve,
34 denotes a signal amplifier, 61 denotes a steering wheel control panel,
71 denotes a stator, 72 denotes a rotor,
73 denotes a slip ring signal line, and 74 denotes a slip ring head.

DETAILED DESCRIPTION

The technical solutions in embodiments of the present disclosure will be described clearly and completely hereinafter with reference to the accompanying drawings in the embodiments of the present disclosure. Apparently, the described embodiments are only a part rather than all of the embodiments of the present disclosure. Based on the embodiments of the present disclosure, all other embodiments obtained by those of ordinary skill in the art without making creative efforts shall fall within the protection scope of the present disclosure.

In the description of the present disclosure, it should be noted that the orientations or positional relationships indicated by the terms "center", "longitudinal", "transversal", "length", "width", "thickness", "upper", "lower", "front", "back", "left", "right", "vertical", "horizontal", "top", "bottom", "inside", "outside", "clockwise", "counterclockwise", "axial", "radial", "circumferential", and the like are based on the orientations or positional relationships shown in the accompanying drawings. It is only for the convenience of describing the present disclosure and simplifying the description, rather than indicating or implying that the devices or elements referred to must have specific orientations, be constructed and operated in specific orientations, and therefore cannot be understood as a limitation on the present disclosure. In addition, the features defined with "first", "second", and "third" may explicitly or implicitly include one or more of the features. In the description of the present disclosure, unless otherwise specified, "a plurality of" means two or more. Moreover, it should be noted that unless otherwise stated for clear provisions and limitations, the terms "mounted", "connected", and "connection" should be broadly understood. For example, it may be a fixed connection, a detachable connection, or an integral connection; it may be a mechanical connection, or an electrical connection; it may be a direct connection, or an indirect connection through an intermediate medium; or it may be an internal communication between two elements. For those of ordinary skill in the art, the specific meanings of the above terms in the present disclosure can be understood according to the specific circumstances.

Referring to FIG. 1 to FIG. 6, provided are a racing simulation device and algorithm based on a high precision and high response torque closed loop. The racing simulation device includes a quick release module 1, a motor module 2, a sensing module 3 and a sleeve 4. One end of the motor module 2 is connected to the sensing module 3. The sensing module 3 is disposed inside the sleeve 4. A connecting seat 5 is disposed at one end of the sleeve 4. One end of the connecting seat 5 is connected to the sleeve 4, and the other end of the connecting seat 5 is disposed inside the quick release module 1. One end of the quick release module 1 is connected to a steering wheel 6.

The quick release module 1 includes a fixed seat 11, an outer cover 12 and a quick release control panel 13. One end of the fixed seat 11 is connected to the steering wheel 6. One end of the connecting seat 5 is disposed inside the fixed seat 11. The outer cover 12 is disposed on the fixed seat 11 in a sleeving manner. The quick release control panel 13 is disposed inside the fixed seat 11. The steering wheel 6 is internally provided with a steering wheel control panel 61. The quick release control panel 13 is electrically connected to the steering wheel control panel 61. The motor module 2 includes a motor body 21. Two ends of the motor body 21 are respectively provided with a front cover 22 and a rear cover 23. The motor body 21 is internally provided with a motor shaft 24. One end of the motor shaft 24 passes through the motor body 21, is disposed inside the sleeve 4, and is connected to the sensing module 3.

The sensing module 3 includes a torsion sensor 31, an expansion sleeve 32 and an adapter sleeve 33. The expansion sleeve 32 is disposed on the motor shaft 24 in a sleeving manner. The adapter sleeve 33 is disposed on the expansion sleeve 32 in a sleeving manner. The torsion sensor 31 is disposed on the adapter sleeve 33 in a sleeving manner, and is connected to the adapter sleeve 33 and the sleeve 4, respectively. The sensing module 3 further includes a signal amplifier 34. The signal amplifier 34 is disposed at one side of the torsion sensor 31. One end of the signal amplifier 34 is connected to the torsion sensor 31. The other end of the signal amplifier 34 is connected to the quick release control panel 13.

A slip ring 7 is further provided on one side of the motor body 21. The slip ring 7 is connected to the motor body 21. The slip ring 7 includes a stator 71 and a rotor 72. The stator 71 is disposed on the rotor 72 in a sleeving manner. The stator 71 is connected to the motor body 21. The rotor 72 is connected to the motor shaft 24. The rotor 72 is provided with a slip ring signal line 73. The slip ring signal line 73 passes through the motor shaft 24 and the connecting seat 5 and is connected to the quick release control panel 13. The slip ring 7 further includes a slip ring head 74. One end of the slip ring head 74 is connected to the rotor 72. A motor control panel 25 located inside the rear cover 23 is disposed at one side of the motor body 21. An encoder is disposed on the motor control panel 25. The slip ring head 74 is positioned corresponding to the encoder. Signals are transmitted under the cooperation of the slip ring head 74 and the encoder.

An algorithm based on a high precision and high response torque closed loop includes a static torsion sensor 31, which detects the torsion on a steering wheel 6; a quick release control panel 13, which performs signal amplification and data conversion; a slip ring 7 and a slip ring signal line 73, through which data transmission is performed; and a motor control panel 25, which receives torsion data for implementation of a torque closed loop algorithm.

The principle of a racing simulation system based on a high response torque closed loop is as follows: the torsion sensor 31 is mounted on the motor shaft 24 between the steering wheel 6 and the motor body 21, which is close to the steering wheel 6, and thus can accurately sense the force of the steering wheel 6 for control. A force signal is transmitted through a hardware circuit in two ways: the first one is that the hardware circuit is provided with an MCU, and a torque analog signal is converted into a digital signal through the MCU, which is then transmitted to a drive circuit board at a rear end of a wheelbase through the slip ring 7 disposed inside the motor via a CAN bus; and the second one is to directly transmit the torque signal to the drive circuit board at the rear end of the wheelbase through the slip ring 7. When the motor shaft 24 rotates under the action of the slip ring 7, the signal line passing through the interior of the motor shaft 24 will not rotate. Then, after the signal of the static torsion sensor 31 is transmitted to a back-end drive board; and through the algorithm, both the torque closed loop and the current closed loop are implemented for precise force control.

Figure 3:
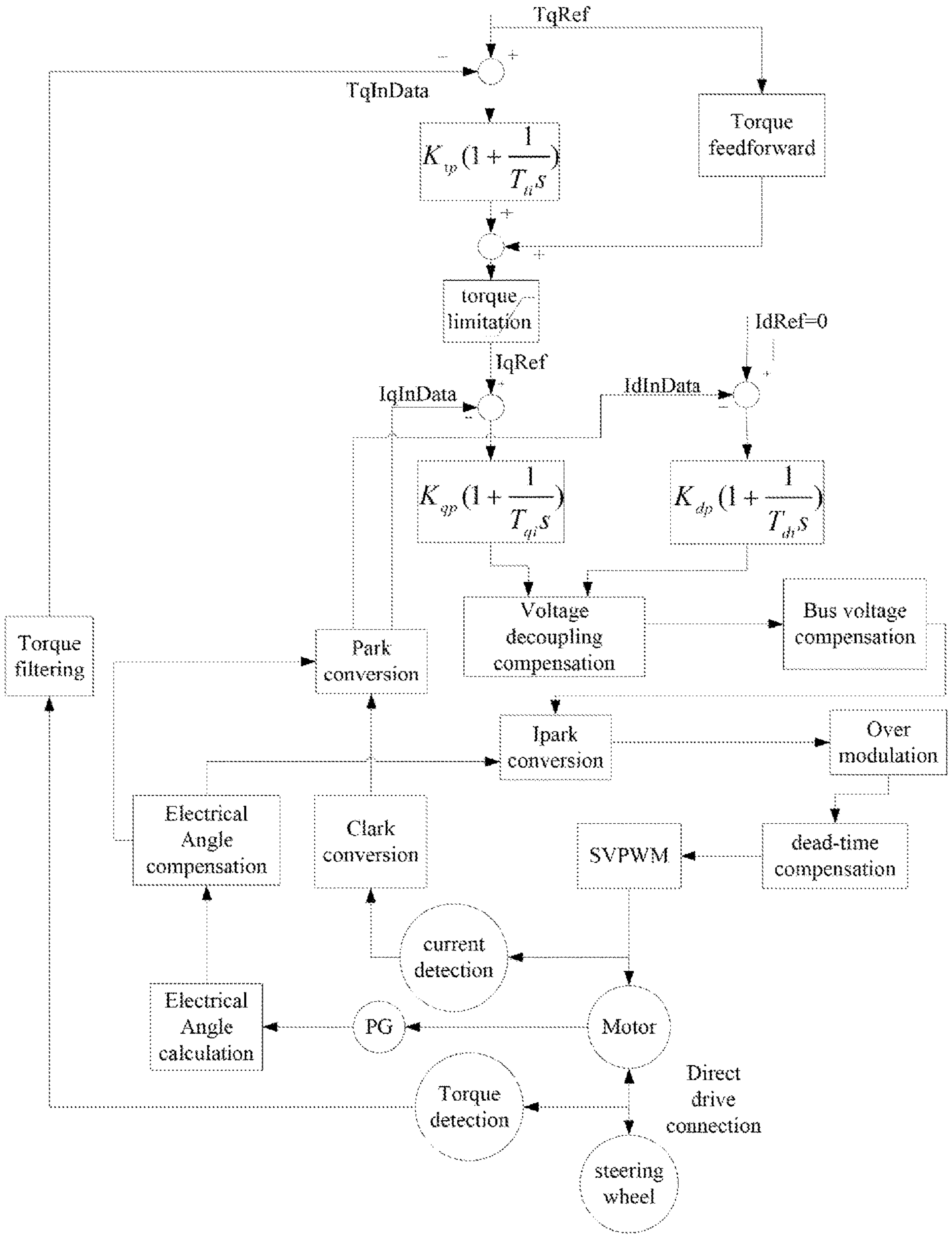
FIG. 3 is a block diagram for implementation of a torque closed loop algorithm according to the present disclosure.
Figure 4:
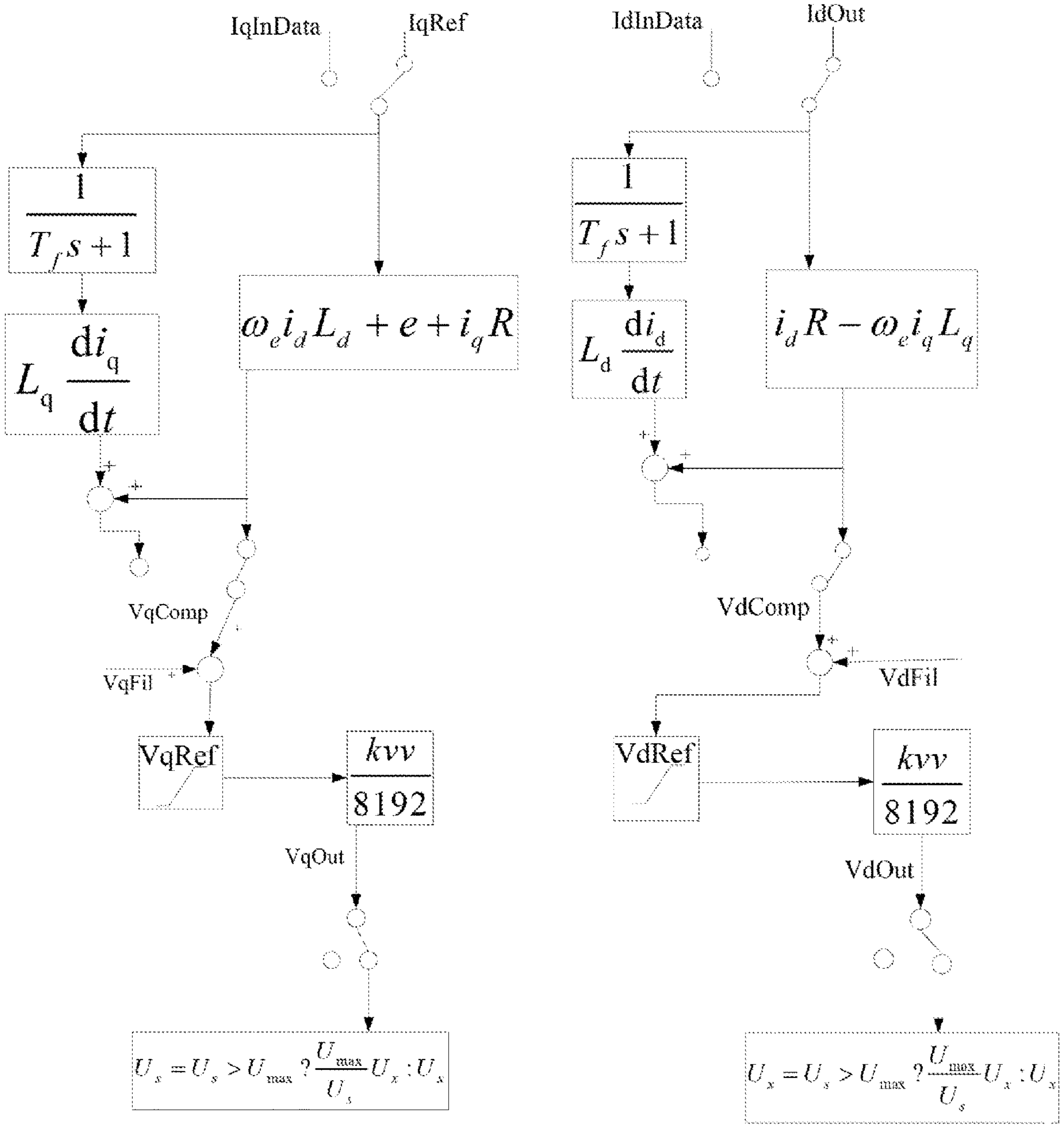
FIG. 4 is a schematic circuit diagram of voltage decoupling according to the present disclosure.
Figure 5:
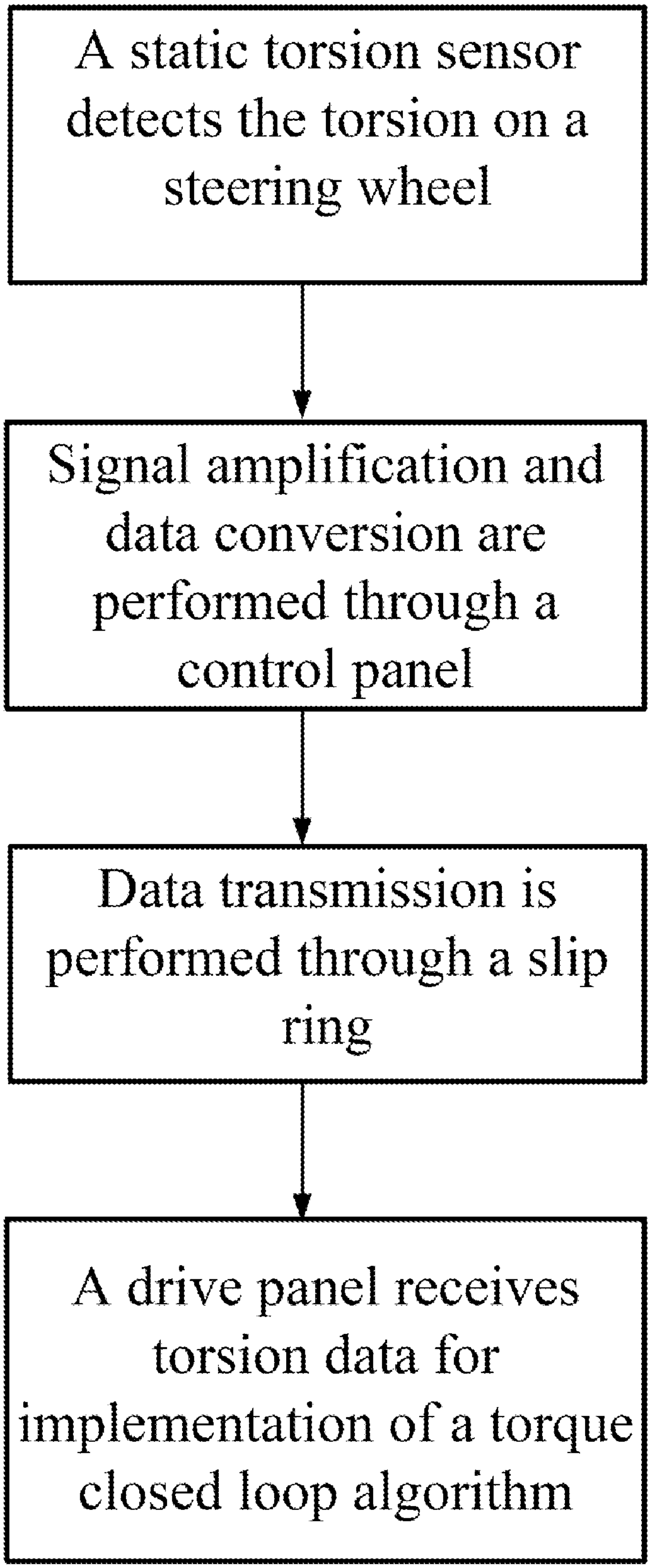
FIG. 5 is a schematic diagram of transmission process of torque signals according to the present disclosure.
Figure 6:
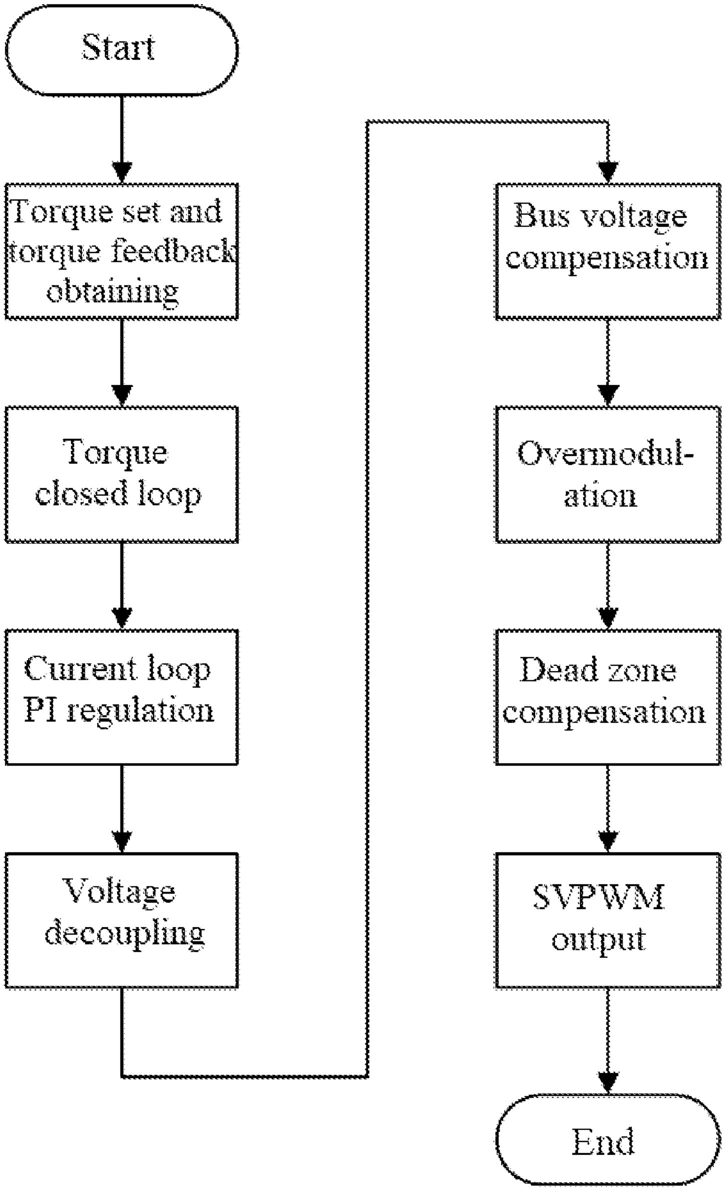
FIG. 6 is a schematic flow chart of the torque closed loop algorithm according to the present disclosure.

As shown in FIG. 3: Torque set: The torque set comes from a racing simulation game, is transmitted via a USB, and is a synthetic torque. Torque feedforward: The torque feedforward is based on a torque equation, and 70% of torque feedforward is generally applied.

$$i_d = 0\left(\beta = \frac{\pi}{2}\right)$$

control electromagnetic torque equation is:

$$T_e = \frac{3}{2} p\psi_f i_q = \frac{3}{2} p\psi_f I_m$$

The torque generated by a unit stator current is a constant value, which can be expressed as:

$$\frac{T_e}{I_m} = \frac{T_e}{\sqrt{2} I_L} = \frac{3}{2} p\psi_f$$

then the torque coefficient is:

$$K_t = \frac{T_e}{I_L} = \frac{3}{2}\sqrt{2}\, p\psi_f$$

Clark ransformation:

$$\begin{bmatrix} i_\alpha \\ i_\beta \end{bmatrix} = \frac{N_3}{N_2}\begin{bmatrix} 1 & -\frac{1}{2} & -\frac{1}{2} \\ 0 & \frac{\sqrt{3}}{2} & -\frac{\sqrt{3}}{2} \end{bmatrix}\begin{bmatrix} i_A \\ i_B \\ i_C \end{bmatrix}$$

Considering $i_A + i_B + i_C = 0$, it can be written as:

$$\begin{bmatrix} i_\alpha \\ i_\beta \end{bmatrix} = \begin{bmatrix} 1 & 0 \\ \frac{1}{\sqrt{3}} & \frac{2}{\sqrt{3}} \end{bmatrix}\begin{bmatrix} i_A \\ i_B \end{bmatrix}$$

Park transformation:

$$\begin{bmatrix} i_d \\ i_q \end{bmatrix} = \begin{bmatrix} \cos\theta & \sin\theta \\ -\sin\theta & \cos\theta \end{bmatrix}\begin{bmatrix} i_\alpha \\ i_\beta \end{bmatrix}$$

Ipark transformation:

$$\begin{bmatrix} u_\alpha \\ u_\beta \end{bmatrix} = \begin{bmatrix} \cos\theta & -\sin\theta \\ \sin\theta & \cos\theta \end{bmatrix}\begin{bmatrix} i_d \\ i_q \end{bmatrix}$$

Voltage decoupling

The voltage equations of d and q axes are:

$$\begin{cases} U_d = L_d \dfrac{dI_d}{dt} + R_s I_d - \omega_r L_q I_q \\ \qquad dl \\ U_q = L_q \dfrac{dI_q}{dt} + R_s I_q + \omega_r (L_d I_d + \psi_f) \end{cases}$$

A current may be a feedback value or given value, with the default being the given value. A choice can be made as to whether or not the voltage equations are made up, and the current is subjected to low-pass filtering, differentiated, and then multiplied by a gain coefficient as a feedforward voltage compensation amount. The feedforward voltage compensation amount is superimposed with voltage compensation amounts of the voltage equations so as to be used as an entire voltage compensation amount.

Judgment of voltage saturation on d and q axes. If saturation occurs, the voltage output on d and q axes will be adjusted proportionally.

Bus voltage compensation: Bus voltage compensation refers to using the ratio of a filtered real bus voltage to a given voltage for compensation.

Torque closed loop: Torque closed loop adopts incremental PI adjustment output, which is accumulated with torque feedforward to output a given current, and current amplitude is limited, so that an entire torque is closed to form a double-closed-loop form in combination with a current closed loop, and torque precision control is further improved. Therefore, during racing simulation, the situations of a racing car crossing a road shoulder, a grassland and a sand land, being loaded, and the like can be truly simulated, which gives people a real feeling, improving the user experience, and bringing ultimate experience especially for a racing driver. For the racing simulation system, the original method is open-loop control, which cannot accurately control the torque. With the torque closed loop, the torque accuracy can be well controlled, thus improving the dynamic response, and greatly improving the customer experience.

The reference terms “an embodiment”, “some embodiments”, “illustrative embodiments”, “examples”, “specific examples”, “some examples”, or the like described herein mean that the specific characteristics, structures, materials, or features described in conjunction with the embodiments or examples are included in at least one embodiment or example of the present disclosure. In this Description, the illustrative expressions of the above terms may not necessarily refer to the same embodiments or examples. Moreover, the specific characteristics, structures, materials, or features described herein may be combined in any suitable manner in any one or more embodiments or examples.

The foregoing descriptions are merely exemplary embodiments of the present disclosure, but the protection scope of the present disclosure is not limited thereto. Any equivalent replacement or modification made by those skilled in the art according to the technical solution of the present invention and the inventive concept thereof within the technical scope disclosed by the present disclosure shall fall within the protection scope of the present disclosure.

What is claimed is:

1. A racing simulation device based on a high precision and high response torque closed loop, comprising a quick release module, a motor module, a sensing module and a sleeve, wherein one end of the motor module is connected to the sensing module, and the sensing module is disposed inside the sleeve; a connecting seat is disposed at one end of the sleeve, one end of the connecting seat is connected to the sleeve, and the other end of the connecting seat is disposed inside the quick release module; and one end of the quick release module is connected to a steering wheel;

wherein the quick release modale comprises a fixed seat, an outer cover and a quick release control panel; one end of the fixed seat is connected to the steering wheel, and one end of the connecting seat is disposed inside the fixed seat; the outer cover is disposed on the fixed seat in a sleeving manner, and the quick release control panel is disposed inside the fixed seat; and the steering wheel is internally provided with a steering wheel control panel, and the quick release control panel is electrically connected to the steering wheel control panel;

wherein the motor module comprises a motor body, and two ends of the motor body are provided with a front cover and a rear cover; the motor body is internally provided with a motor shaft; and one end of the motor shaft passes through the motor body, is disposed inside the sleeve, and is connected to the sensing module;

wherein the sensing module comprises a torsion sensor, an expansion sleeve and an adapter sleeve; the expansion sleeve is disposed on the motor shaft in a sleeving manner, and the adapter sleeve is disposed on the expansion sleeve in a sleeving manner; and the torsion sensor is disposed on the adapter sleeve in a sleeving manner, and is connected to the adapter sleeve and the sleeve.

2. The racing simulation device based on a high precision and high response torque closed loop according to claim 1, wherein the sensing module further comprises a signal amplifier, and the signal amplifier is disposed at one side of the torsion sensor; and one end of the signal amplifier is connected to the torsion sensor, and the other end of the signal amplifier is connected to the quick release control panel.

3. The racing simulation device based on a high precision and high response torque closed loop according to claim 2, wherein a slip ring is further provided on one side of the motor body, and the slip ring is connected to the motor body; the slip ring comprises a stator and a rotor, and the stator is disposed on the rotor in a sleeving manner; the stator is connected to the motor body, and the rotor is connected to the motor shaft; and the rotor Is provided with a slip ring signal line, and the slip ring signal line passes through the motor shaft and the connecting seat and is connected to the quick release control panel.

4. The racing simulation device based on a high precision and high response torque closed loop according to claim 3, wherein the slip ring further comprises a slip ring head, and one end of the slip ring head is connected to the rotor; a motor control panel located inside the rear cover is disposed at one side of the motor body; and an encoder is disposed on the motor control panel, and the slip ring head is positioned corresponding to the encoder.

* * * * *